United States Patent [19]

Haanschoten

[11] Patent Number: 5,713,259
[45] Date of Patent: Feb. 3, 1998

[54] SAW DISC FOR A HIGH SPEED HAND SAWING MACHINE

[76] Inventor: Jozef Gijsbert Haanschoten, Haspel 18, 3905 NB Veenendaal, Netherlands

[21] Appl. No.: 684,215

[22] Filed: Jul. 19, 1996

[30] Foreign Application Priority Data

Aug. 1, 1995 [NL] Netherlands ............ 1000912

[51] Int. Cl.[6] ............ B27B 33/08; B23D 61/02
[52] U.S. Cl. ............ 83/835; 83/478; 83/676; 83/852; 83/855; 30/347
[58] Field of Search ............ 83/835, 852, 855, 83/676, 478; 30/347; 76/112

[56] References Cited

U.S. PATENT DOCUMENTS

| 139,176 | 5/1873 | Miller | 83/676 |
|---|---|---|---|
| 149,748 | 4/1874 | Hale | 83/835 |
| 1,550,342 | 8/1925 | Cogley | 30/347 X |
| 1,811,079 | 6/1931 | Forsyth | 83/855 |
| 2,366,017 | 12/1944 | Fortune | 30/370 |
| 2,559,355 | 7/1951 | Grupp | 83/855 |
| 3,125,139 | 3/1964 | Weinzierl | 83/676 X |
| 3,406,729 | 10/1968 | Cooper | 83/855 |
| 4,034,638 | 7/1977 | Drum | 83/676 X |
| 4,432,264 | 2/1984 | Scott | 83/835 |
| 4,515,055 | 5/1985 | Scott | 83/835 |
| 4,850,407 | 7/1989 | Inkster et al. | 83/835 X |
| 5,090,287 | 2/1992 | Chezem | 83/838 |
| 5,216,797 | 6/1993 | Hall | 83/835 X |
| 5,400,493 | 3/1995 | Hall | 83/835 X |

FOREIGN PATENT DOCUMENTS

| 0 072 642 | 7/1982 | European Pat. Off. . | |
| 0292246 | 11/1988 | European Pat. Off. . | |
| 2 570 317 | 9/1984 | France . | |
| 2101614 | 7/1972 | Germany | 83/855 |
| 33 05 113 | 2/1983 | Germany . | |
| 170169 | 1/1960 | Sweden | 83/835 |
| 713 368 | 3/1952 | United Kingdom . | |

*Primary Examiner*—Rinaldi I. Rada
*Assistant Examiner*—Clark F. Dexter
*Attorney, Agent, or Firm*—Larson & Taylor

[57] ABSTRACT

A high speed hand tool includes a saw disc having less than ten teeth, preferably four. Each tooth has a radial flank, which preferably inclines forward in the cutting direction, and a tangential flank, which has a small clearance angle. The teeth may have a greater thickness than the disc itself which thickness, in that case, diminishes in a direction opposite to the direction of rotation. Alternatively, the teeth may be offset alternately to the right and the left. The invention also comprises an adjustable protective device which enables setting the depth of a perpendicular saw cut.

12 Claims, 4 Drawing Sheets

SAW DISC FOR A HIGH SPEED HAND SAWING MACHINE

FIELD OF THE INVENTION

The invention relates to a high speed tool, in particular a hand tool such as a rotary tool or the like with a disc, which at the outer side is provided with sawing means.

BACKGROUND OF THE INVENTION

Such a high speed tool is known in many versions and of various suppliers and, for instance, is used as a grinding tool. The speed of such a tool is high, usually 8000 or more revolutions per minute.

An attempt to make such a tool suitable for sawing purposes, as is indicated in United States Patent No. 5,090,287, consists in mounting a chain saw to the circumference of a disc. The flange-shaped projections of a conventional chain saw, which are directed away from the sawing face, are constrained between two discs in the axial direction. This means a rather complicated and therefor expensive construction. Moreover such a saw gives a wide saw cut, which usually is far from being smooth.

SUMMARY OF THE INVENTION

The invention aims to remove these disadvantages and to provide for a considerably inexpensive construction.

According to the invention the above purposes are realized by providing that the saw teeth are divided over the circumference of the disc and are part thereof or are separately and permanently connected thereto.

According to a further embodiment of the invention it is provided that each tooth has a cutting edge with an adjacent radial flank and an adjacent tangential flank.

Preferably it is provided therewith that the number of teeth is less than ten.

The European patent application EP-A-0.292.246 shows a tool for the removal of material from a wooden object, with a bowl-shaped disc with less than ten teeth at its circumference. The bowl-shaped disc makes this tool unsuitable for sawing purposes. Moreover the teeth have cutting edges for a radial cut and to cut in the transverse direction. Also a projection is needed for every tooth, that limits the saw depth of the tooth in both cutting directions.

This tool has considerably more complicated teeth than those of the invention, which also means a considerably more difficult and laborious way of grinding.

The invention makes use of the fact that due to the very high speed of the utilized hand tool only very few saw teeth on the circumference are needed. Moreover, a larger number of teeth would lead to either too heavy a load on the motor, that is with very high speed sawing, or a rather stiff operation, because with a larger number of saw teeth the phenomenon will occur, that a number of teeth will not cut at all, but abut the material to be sawed and slide along it, which costs unnecessary energy and causes rises in temperature as a consequence of which the saw and workpiece become too hot and the teeth become blunted rather soon.

By applying the invention, that is with a small number of teeth, an operation using all teeth for cutting is easily obtained.

High speed saws are generally suitable for wood, artificial material, plaster and the like, but not for metal or concrete. This also applies for the saw according to the invention. However, it has the important advantage that by way of the simple shape of the saw tooth and the small number of teeth, grinding thereof, for instance after a nail has been hit, can be done very fast.

The invention also provides for a saw disc with teeth at the circumference, which is suitably applied in the tool according to the invention. Such a saw disc is characterized in that the number of teeth is less than ten and in that each tooth has at least a cutting edge with an adjacent radial flank and an adjacent tangential flank.

It has appeared that a good cutting operation can be obtained when the radial flank at the cutting edge inclines forward in the direction of rotation. The radial flank does not necessarily have to be straight, but for instance may have a curved shape, which has the advantage that with the manufacturing of saw discs according to the invention in small series the material in front of the radial flank may be removed by drilling.

Preferably the radial flank inclines forward at the cutting edge at an angle between −5° and +15°.

According to a further elaboration of the invention it is provided that the tangential flank has a clearance angle relative to the path of movement of the cutting edge. Preferably the clearance angle lies between 2° and 5°. The most important advantage thereof is that the teeth may be sharpened repeatedly by filing without having a noticeable effect on the radius of the saw disc. Moreover, with a curved radial flank, the sharpening may be effected by means of a round file or a rat's-tail.

According to still a further elaboration of the invention it is provided that the tangential flank lies on a circular arc, the center of which lies at a distance from the center of the disc of 0.06 to 0.3 times the distance from the outer end of the radial flank to the center of the disc, and which is located beside the bisector of a portion of the disc bounded by the radii of the disc through two successive cutting edges. This embodiment has the advantage that behind the cutting edge of a tooth, first an increasing space appears followed by an again decreasing space until relatively near the radial edge of the next tooth, to thereby prevent the teeth from having too great an in-feed.

Preferably the number of teeth is four, specifically with discs with a diameter of 15–30 cm. However it is also possible to work with less teeth and it is even possible to saw in a reasonable manner with only one tooth (in which case the disc in fact may consist of only an arm). Larger numbers than four give disadvantages rather than advantages, particularly with respect to the larger number of teeth that possibly have to be sharpened.

In an embodiment in which a clearance in the direction perpendicular to the disc is realized, the teeth have a greater thickness perpendicular to the disc at their cutting edge than the remaining part of the circumference of the disc, which greater thickness diminishes gradually behind the cutting edge to the thickness of the remaining part of the circumference of the disc.

Preferably the angular distance, over which a tooth has a greater thickness than the remaining part of the circumference of the disc, is about 10° to 20°.

Such a disc may be manufactured by grinding or turning material from the middle of the disc until near the edge. Next, part of the edge can be removed, for instance when the radial clearance is made by way of grinding.

With an embodiment of the disc according to the invention, with the disc having the same overall thickness, it is preferably provided that, in a way known per se, the teeth are offset alternately in the opposite direction from the plane of the disc. Preferably the set of the teeth is about 0.1–1.0 mm. With saw tests it has appeared that the thickness of the disc has little influence on the sawing results, but evidently that a disc with a smaller thickness gives a smoother saw cut and requires less energy. In practice the thickness of the disc is chosen as thin as can be consistent with a good stability of the disc. Discs made of steel or rust resistant steel gave good results with a thickness from 1.0 to 3.0 mm.

The material of the saw disc according to the invention preferably has to meet the requirement that it has a satisfactory hardness, but not such a hardness that it is no longer possible to file it. This is the case with for example abrasion and rust resistant steel, for example, chromium steel.

Finally a disc with the tooth shape according to the invention may also be provided with teeth of abrasion resistant material, such as widia. However the advantages of easily sharpening are lost therewith, while also the impact load resistance, when hitting a material of a too great hardness, is hardly maintained, because a broken widia tooth commonly results in a disc which no longer is usable.

A tool which includes the disc as described above has to be provided with a protective device, which at least guards one side of the disc.

According to a further elaboration of the invention in which the disc is used as a saw, the protective device has an opening to let pass a segment of the saw disc, which opening lies in a plane parallel to the axis of rotation of the saw disc.

This offers the possibility to obtain a saw cut perpendicular to a flat part of the object to be worked.

According to a further elaboration of the invention it can be provided that the distance from the plane to the center line of the axis of rotation is adjustable. This offers the possibility to give the saw cut a predetermined depth, for example for the sawing of rabbets.

The invention also comprises a guard suitable to be mounted on a tool according to the invention.

BRIEF DESCRIPTION OF THE DRAWINGS

The invention is elucidated in the following on basis of the drawing, in which.

DETAILED DESCRIPTION OF THE PREFERRED EMBODIMENTS

Figure 1:
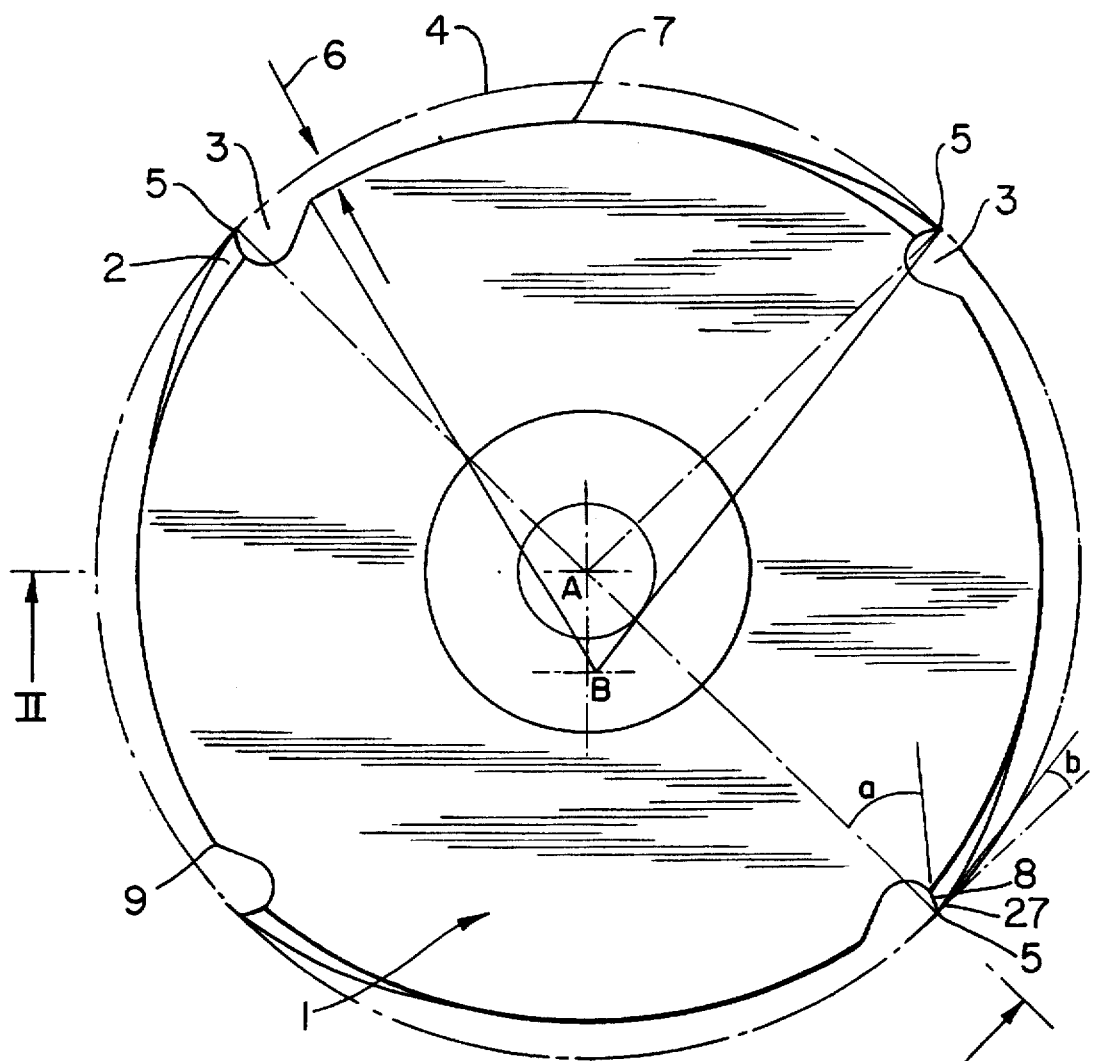
FIG. 1 schematically shows a side view of the saw disc according to the invention.
Figure 2:
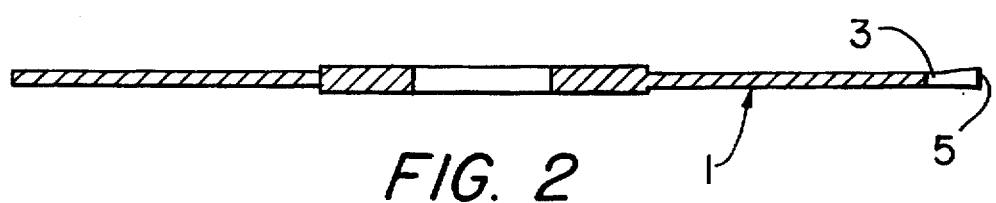
FIG. 2 shows a radial view thereof.

In FIG. 1 a steel disc is indicated with 1, provided with four teeth 2, which have a slightly larger thickness than the disc 1, as appears from FIG. 2. The teeth 2 are preceded by a recess 3, which preferably is slightly larger than a semi-circle. The original circle shaped circumference of the disc 1 is indicated with 4, A being the center of said circumference forming circle.

As can be seen from the drawing said circle goes through the cutting edge, which is indicated with the point 5 of the cutting teeth. From point 5 of the cutting edge, shown in the upper right, a circular arc is drawn with center B, which is located somewhat beside the bisector of the radii from A to both cutting edges 5 and below the center A. Point B has been chosen such that a predetermined in-feed 6 is left clear and furthermore that the edge 7 of the disc from right to left is located first at the level of a cutting edge 5, then deflects inwardly from the circular shape and finally, near the next cutting edge 5, is located at a distance of approximately the total in-feed within the circle through the cutting edges 5. More specifically, point B has been chosen such that a distance between point B and point A ranges from 0.06 to 0.3 times a distance from the cutting edge 5 to point A, point B being located beside a bisector of a portion of the disc bounded by radii of the disc taken at two successive cutting edges.

As can be seen further the cutting edges 5 have a front flank or radial flank 8, which encloses an angle "a" with the radius of the circle and a rear flank, or tangential flank 27. The clearance angle relative to the path of the cutting edge is indicated with "b".

It will be clear that with the filing of the recess 3 almost the same radius of the saw disc will be kept, and that a change will be noticeable only after a large part is filed, for example one centimeter. In practice this will rarely happen, because it has appeared that with a disc according to the invention, made of abrasion or rust resistant steel, it is possible to saw wood for a very long time without the teeth becoming dull.

For the sake of clarity the maximum in-feed 6 and the angles "a" and "b" are drawn on an enlarged scale.

FIG. 2 shows a view along line II—II of FIG. 1. From this can be seen that the edges 2 of the cutting teeth provide a cutting edge 5 with a greater width than that of the disc.

Figure 3:
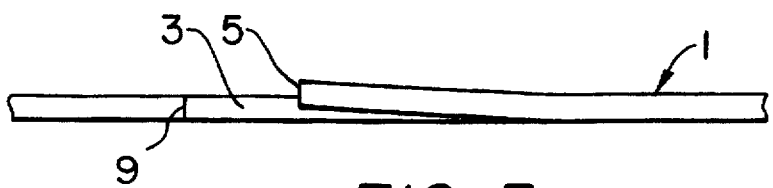
FIG. 3 shows a corresponding view of another embodiment.

FIG. 3 shows a view of a set tooth with a cutting edge 5 and a recess 3 with a boundary 9.

Figure 4:
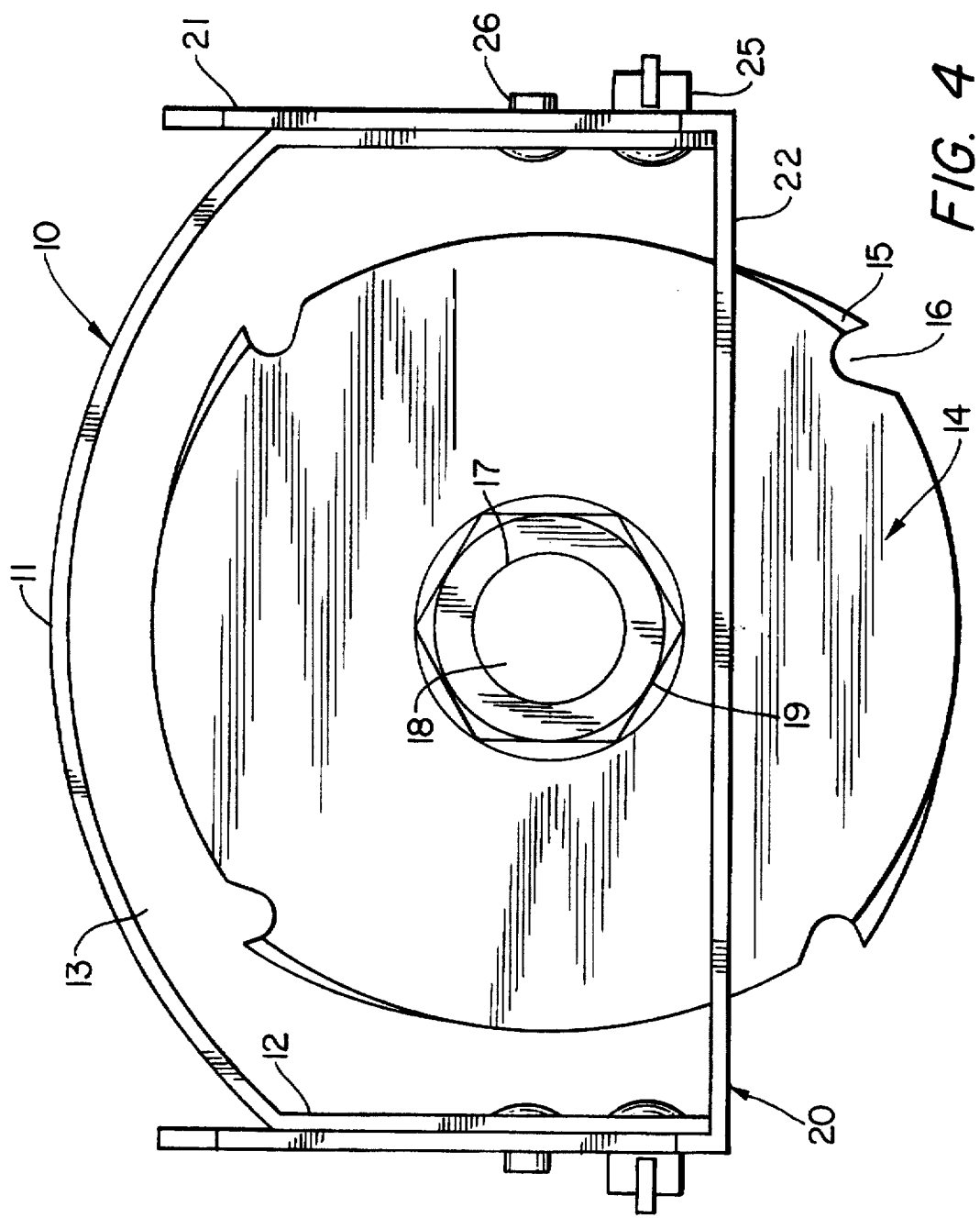
FIG. 4 shows a view of the saw disc with the protective device for it.

As is shown in FIG. 4 the protective device consists of a first part 10, with a hood-shaped upper part 11, two vertical walls 12 and a vertical back wall 13.

Disc 14, which is provided with four cutting teeth 15 and recesses 16 in front of the teeth, has a hole 17 with which it fits over axis 18, to which it is fastened by means of nut 19.

The wall 13 is fastened to the housing of a rotary tool (not shown) around axis 18 with a clamping ring (not shown).

Figure 6:
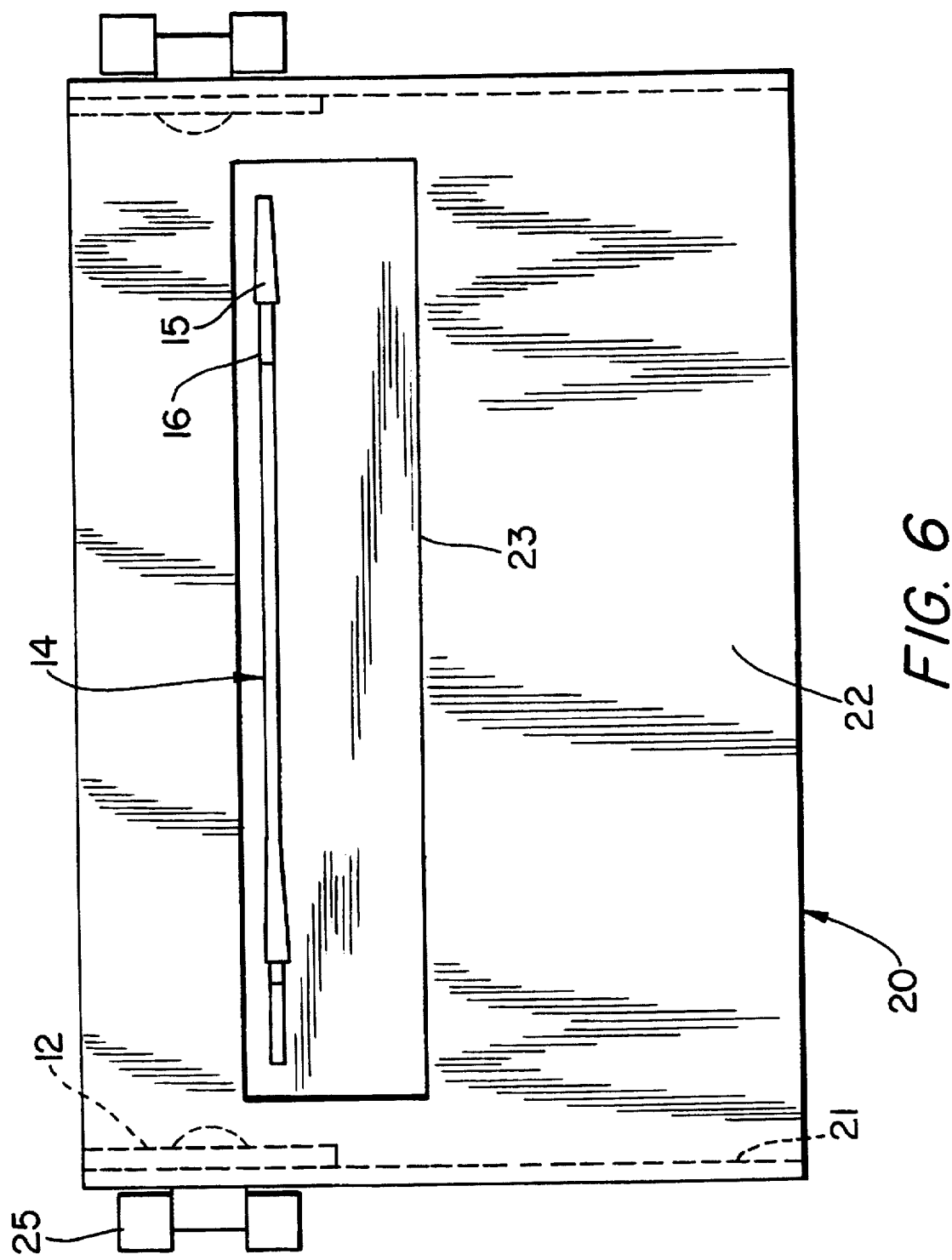
FIG. 6 shows a lower view of the protective device.

The protective device comprises a second part 20 with a vertical wall 21 and a horizontal plane 22. In the plane, as is indicated in FIG. 6, an oblong slot is made, through which a segment of disc 14 protrudes. A relatively large space for disc 14 is left out in slot 23, as a result of which a possible line of sawing can be seen easily.

Figure 5:
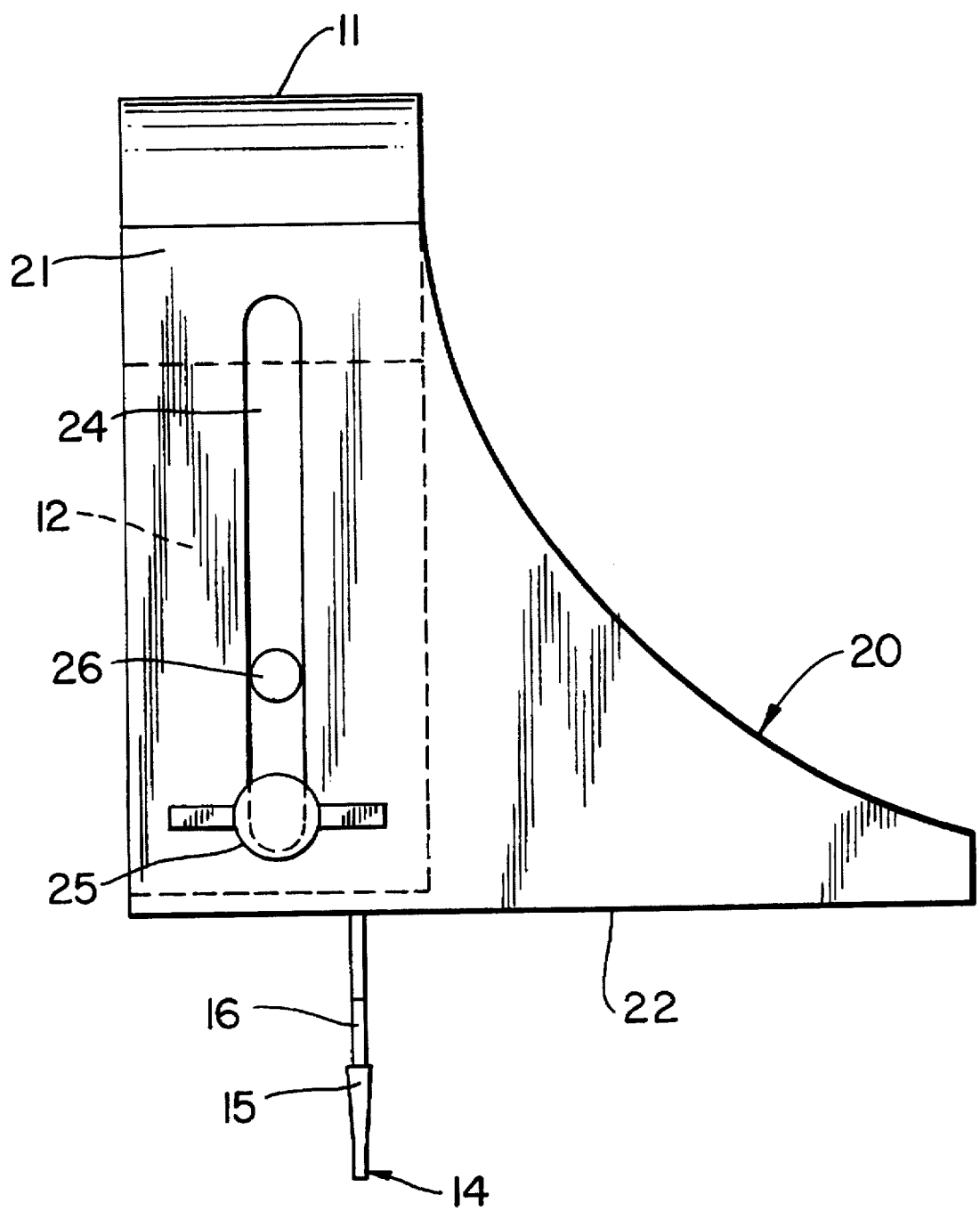
FIG. 5 shows a side view of the protective device according to FIG. 4.

As can be seen more in particular from the side view of FIG. 5, in which the same parts are indicated with the same references as before, a slot 24 is provided in the side walls 21, with a wing screw 25, which is screwed in the side walls 12 of part 10 and with a guiding pin 26, which is also mounted on wall 12. By loosening the wing screws on either side of the protective device, part 11 may be moved relative to part 20, as a result of which the depth to which the disc protrudes through opening 23 may be adjusted.

The shown protective device is safer than a guard as is commonly used with grinding tools in which bottom 22 is missing. In addition to allowing for adjustability, slots 24 and wing screws 25 allow for sawing in a perpendicular direction with a desired cutting depth.

Although the teeth of the described shape, made of abrasion or rust resistant steel, have a long working life when sawing wood and the like and can be sharpened by filing with for example a rat's-tail in a very short time, it is also possible to use teeth made of hardmetal. This is more expensive than forming the teeth out of the disc itself, but will give a longer working life. Moreover, when hitting a nail the possibility exists that a widia tooth will become irreparably damaged.

The combination of sawing tool and protective device gives the ability of sawing along a perpendicular path with one hand, with the object to be sawed held in the other hand. Also the tool can be put away safely without the saw disc contacting anything.

I claim:

1. A saw disc comprising teeth spaced around an outer circumference thereof, each of said teeth having a cutting edge formed by an adjacent radial flank and an adjacent tangential flank, the tangential flank defining a circular arc and forming a clearance angle with a path of movement of the cutting edge about a center of the disc, wherein a distance between a center of the circular arc and the center of the disc ranges from 0.06 to 0.3 times a distance from the cutting edge to the center of the disc, the center of the circular arc being located beside a bisector of a portion of the disc bounded by radii of the disc taken at two successive cutting edges.

2. The saw disc according to claim 1 comprising less than ten teeth.

3. The saw disc according to claim 2 comprising four teeth.

4. The saw disc according to claim 1 wherein the radial flank, at the outer end, inclines in a forward direction of rotation of the saw disc.

5. The saw disc according to claim 1 wherein the radial flank inclines in a forward direction of rotation of the saw disc at the respective cutting edge of the saw disc at an angle between −5° and +15° with respect to a radius of the saw disc taken from the center of the disc through the respective cutting edge.

6. The saw disc according to claim 1 wherein the clearance angle is between 2° and 5°.

7. The saw disc according to claim 1 wherein each of the teeth have a greater thickness perpendicular to opposite faces of the disc at the cutting edges of the teeth than a thickness of a remainder of the circumference of the disc, the thickness at the cutting edge diminishing gradually behind the cutting edge to the thickness of the remainder of the circumference of the disc.

8. The saw disc according to claim 7 wherein the angular distance over which a tooth has a greater thickness than the remainder of the circumference of the disc is about 10° to 20°.

9. The saw disc according to claim 1 wherein the teeth and the remainder of the circumference of the disc have the same thickness and the teeth are set alternately in opposite directions from a plane of the disc.

10. The saw disc according to claim 9 wherein the set of the teeth is about 0.1–1.0 mm.

11. The saw disc according to claim 1 wherein the disc has a maximum thickness of 1.0 to 3.0 mm at the circumference.

12. The saw disc according to claim 1 wherein the disc comprises a material selected from the group consisting of abrasion resistant steel and rust resistant steel.

* * * * *